2,592,374

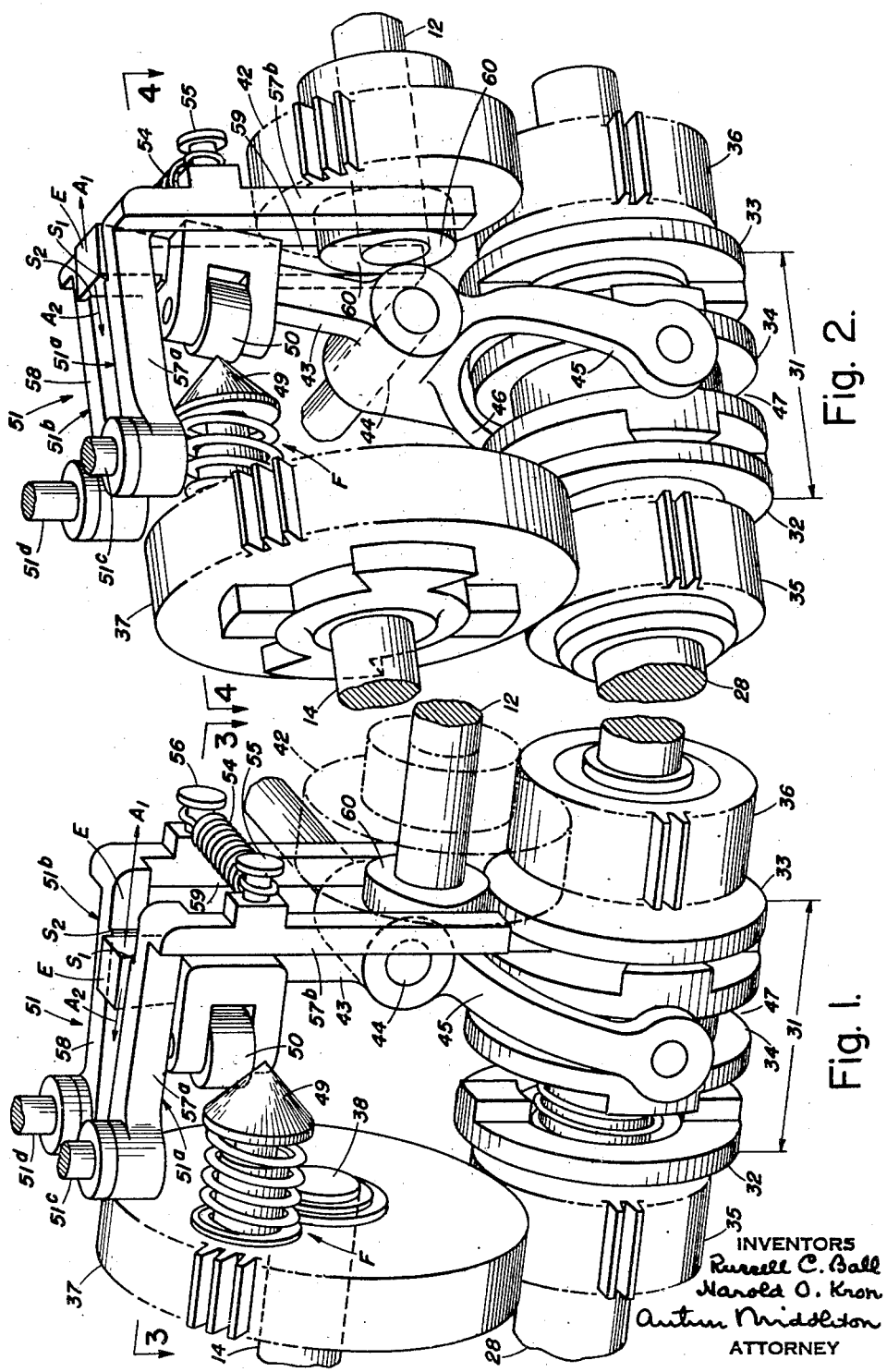

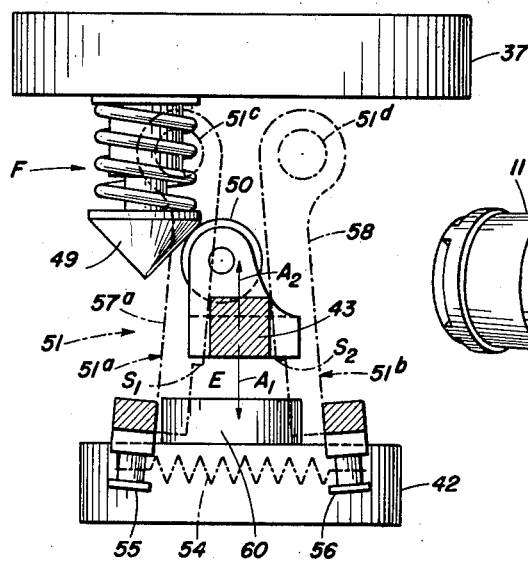
Fig. 3.
Fig. 4.
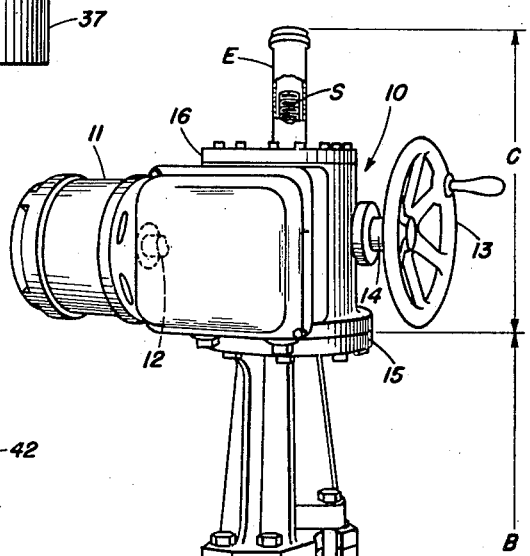
Fig. 5.
INVENTORS
Russell C. Ball
Harold O. Kron
Arthur Middleton
ATTORNEY INVENTORS
Russell C. Ball
Harold O. Kron
Arthur Middleton
ATTORNEY Patented Apr. 8, 1952

UNITED STATES PATENT OFFICE 2,592,374

VALVE ACTUATING MECHANISM

Russell C. Ball, Wynnewood, and Harold O. Kron, Philadelphia, Pa., assignors to Philadelphia Gear Works, Inc., Philadelphia, Pa., a corporation of Pennsylvania Application July 30, 1951, Serial No. 239,336

11 Claims. (Cl. 74—625)

This invention relates to motorized drive mechanism for power operated valves which are operable at will either by hand or by power. More specifically, this relates to improvements in automatic, mechanical interlocking devices effective between the hand drive and power-drive means for such mechanisms.

Valve actuating mechanisms of the kind herein contemplated comprise as part of the drive mechanism means for selectively operating the valve gate or the like either by power or by hand with interlocking means effective between them for precluding a coincidence of power and manual operation, or precluding the interference of the one with the other. Indeed the Patent No. 2,114,013 to R. C. Ball discloses a drive mechanism in which a clutch member is shifted in one direction for engaging the power drive means and is shifted in the opposite direction for engaging the manually actuated means for operating the valve as by the rotation of a customary hand wheel.

Usually such a valve has a valve gate having a screw spindle or stem movable up and down by the rotation of a nut for opening and closing the valve, which nut is turnable either by the power drive- or the hand-drive means. The nut may be unitary with a worm gear rotated by a worm shaft which is driven by the power means, which worm shaft may be termed more particularly the nut-driving shaft.

The power drive means in that patent are operationally interlocked with the hand wheel-actuated means in such a manner that the starting of the power will automatically cause the shifting of a clutch member from its hand operated position to the power operated position, thus disconnecting the hand wheel while connecting the power means, so as to avoid a coincidence of hand and power operation and the interference of the one with the other. However, in that patent as shown, once the clutch member has thus been shifted for power drive connection, the operator must manipulate a de-clutching hand lever which shifts the clutch member out of its power drive connection into the hand actuated connection, whereupon the operator may proceed to open or close the valve by turning the customary hand wheel for raising or lowering the stem of the valve gate.

That is to say, the drive mechanism of that patent is semi-automatic in so far as the shifting of a clutch member automatically disconnects the clutch member from the hand operated drive means while connecting it to the power drive, but as shown requires the manipulation of the hand lever for shifting the clutch member from hand operation to power operation. In this way it was necessary for the drive mechanism to be set or conditioned either by manipulating and shifting the hand lever or by making sure that this hand lever is in the desired position, before an operator can proceed to rotate the hand wheel for manually opening or closing the valve gate.

It is among the objects of this invention to provide full automatic, mechanical interlocking means between power drive means and hand drive means, whereby not only will the starting of the power establish power drive connection while disconnecting and neutralizing the hand wheel-actuated drive means; but whereby starting of the rotation of the hand wheel will automatically establish hand drive connection so that no special manipulation for setting or conditioning the drive mechanism will be required preliminary to hand operation.

More specifically, it is among the objects of this invention to provide interlocking mechanism that is fully automatic in the sense that it controls a shiftable clutch member in such a manner as to connect automatically the power drive means while disconnecting the hand drive means whenever the power is started, but also to disconnect the power drive means when idle while connecting the hand drive means whenever an operator starts turning the hand wheel.

Another object is to provide full automatic interlocking means between the power and the hand operated drive means that are efficient, compact, simple and reliable in operation, as well as readily accessible.

According to the invention at least some of these objects are attained by providing a clutch member shiftable upon and rotatable with a driving shaft which is common to both the power- and the hand-drive means. Automatic interlocking means are provided in such a manner that operation of the power means shifts the clutch member into power drive connection, whereas when the power drive is idle operation of the hand wheel shifts the clutch into hand drive connection. The automatic interlocking means comprise primary leverage means activated only by the rotation of the hand wheel to act upon the clutch means for urging it into driving connection with the hand wheel shaft; secondary mechanical means activated only by rotation of the motor means to act upon the clutch means for urging it into driving connection with the motor shaft.

According to one feature the clutch member is shiftable between a pair of idler gears provided upon the shaft, of which one idler gear is rotatable from the hand wheel, while the other idler gear is rotatable from the power means so that shifting the clutch member may connect either the one or the other idler gear to the driving shaft; and automatic interlocking means are provided that are effective to preclude connection of the power means when the hand drive means are connected and vice versa.

According to a specific feature a hand wheel-driven gear meshes with the one idler gear while a power driven gear meshes with the other idler gear, an automatic interlocking mechanism is operatively interposed between the hand wheel driven gear and the power driven gear for shifting the clutch member in one direction out of hand operable connection and into power operable connection whenever the power is started; which interlocking mechanism also operates to shift the clutch member out of hand operable connection and into power operable connection whenever rotation of the hand wheel is started.

According to still another feature the interlocking means comprise a movable main interlocking member operable for shifting the clutch member in the one or in the other direction, such shifting movements of the interlocking member being selectively controllable by the operation of the power driven gear and the operation of the hand wheel driven gear, respectively. That is to say, rotation of the power driven gear moves the interlocking member to shift the clutch member into power drive connection with the respective idler gear and consequently with the driving shaft; whereas rotation of the hand wheel driven gear moves the interlocking member to shift the clutch member into hand drive connection with the respective idler gear and consequently with the driving shaft.

More specifically this feature provides interlocking means which comprise a main interlocking member in the form of a double armed interlocking lever, one arm of which engages upon and shifts the clutch member between hand drive and power drive positions, with a spring normally urging the clutch member into power drive position. A catch is provided to engage upon the other or free arm of this lever for holding it and the clutch member connected with the hand drive means against the pressure of the spring; but when the power driven gear rotates it trips the catch to disengage it from the interlocking lever, allowing the spring to shift the clutch member from hand-drive into power-drive connection. The hand wheel driven gear carries cam means for engaging the free end of the interlocking lever with every revolution of that gear and for thereby moving the free end of this lever against the pressure of the spring and far enough to be re-engaged by the catch. In this way the power drive means will operate to keep the catch disengaged or tripped out of engagement with the interlocking lever so the spring can urge and hold the clutch member in power drive position; whereas the rotation of the hand wheel operates to move the interlocking lever and with it the clutch member into hand drive position as defined by the catch holding the lever against the pressure of the spring.

A further feature is specific to the cam means effective between the hand wheel operated gear and the free end of the interlocking lever. The free end of the lever carries a cam roller engageable by a cam finger having a conical tip. This cam finger extends from the hand wheel-actuated gear so that while overriding the cam roller it depresses the lever until that lever is caught by the catch. Moreover the cam finger is yieldable against the pressure of a spring, that is in effect greater than that of the spring pressure that urges the clutch member, so that the spring loaded cam may yield sufficiently to avoid damage to the mechanism in the event that the lugs of the clutch member should not by any chance properly mesh with complementary recesses on the hand-wheel-actuated gear.

According to a feature further particularizing the interlocking means, the catch comprises a pair of arms straddling the free end of the lever and swingable in a horizontal plane, an interconnecting spring between the arms urging the arms towards each other with a shoulder provided on each arm for catching and holding the free end of the interlocking lever in hand wheel actuated position. Each of the two swingable arms has a downward extension, two extensions having between them a cam member rotating with a power driven gear and by its rotation swinging or oscillating first one and then the other of the two arms for insuring the release of the interlocking lever when the power drive is operating.

According to the practical embodiment shown and described herein with any or all of the foregoing features employed or employable, the clutch member and its associated members or idler gears are provided upon what was initially defined as the nut-driving shaft.

Briefly stated, this invention provides interlocking means so interposed and automatically effective between the motor means and the hand wheel operated drive means for the worm shaft that turning of the hand wheel shaft will move the clutch means to activate the drive connections for the hand wheel while neutralizing or de-activating the drive connection for the motor means and vice versa for raising and lowering the valve stem selectively by power or manually. The interlocking devices comprise primary leverage means activated only by rotation of the hand wheel shaft to move the clutch member into driving connection with the hand wheel, and secondary mechanical means activated only by rotation of a shaft of the motor means to move the clutch means into driving connection with the motor means. The activation of the mechanical means is effected through means projecting from the shaft of the motor means while activation of the leverage means is effected by other means projecting from the hand wheel shaft. Cam means constitute projecting means on the one shaft for activating the mechanical means, while reciprocable means associated with the other shaft activate the leverage means.

The invention may be embodied in other specific forms without departing from the spirit or essential characteristics thereof. The present embodiment is therefore to be considered in all respects as illustrative and not restrictive, the scope of the invention being indicated by the appended claims and all changes that come within the meaning and range of equivalency of the claims are therefore intended to be embraced therein.

In the drawing:

Figure 1 is a perspective view of the interlocking mechanism for the valve operator and associated parts therewith, with the mechanism conditioned for power drive operation.

Figure 2 is a perspective similar to the Figure 1 perspective although taken under a different angle, with the mechanism conditioned for hand drive operation.

Figure 3 is a detail top view of the interlocking mechanism taken on line 3—3 of Figure 1.

Figure 4 is a similar detail top view of the interlocking mechanism taken on line 4—4 of Figure 2.

Figure 5 is a general perspective view of the valve unit with valve actuating mechanism.

Figure 7:
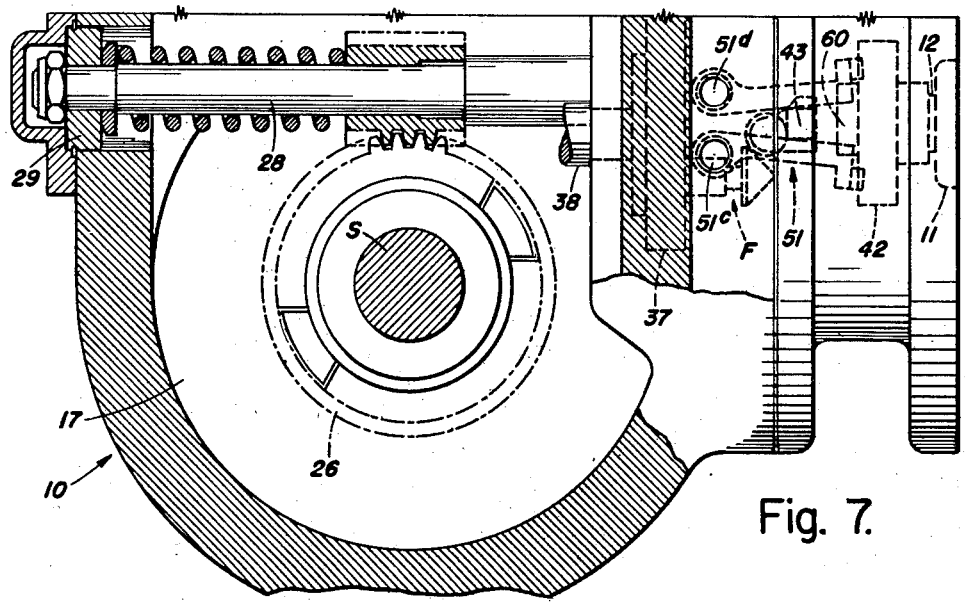
Figure 7 is a cross section of Figure 6 taken on line 7—7.

The unit shown in the general perspective view of Figure 5 comprises a section A comprising the valve housing and valve proper, the yoke section B, and the section C containing the motor-actuated drive means together with the manually actuated drive means for the valve stem, as well as the interlocking mechanism. These mechanisms are contained in a housing 10 which is identifiable also in Figures 6 and 8. A motor 11 with its shaft 12 is carried by the housing 10 at one side thereof indicating the motor-actuated means, while a hand wheel 13 with its shaft 14 at the opposite side of the housing indicates the manually driven means.

The housing 10 has a bottom flange fastened to a top flange 15 of the yoke section B; a top member 16 closes the housing 10, having an upward hollow cylindrical extension E for accommodating the valve stem S when rising due to the operation of either the motor driven means or of the manually driven means.

Figure 6:
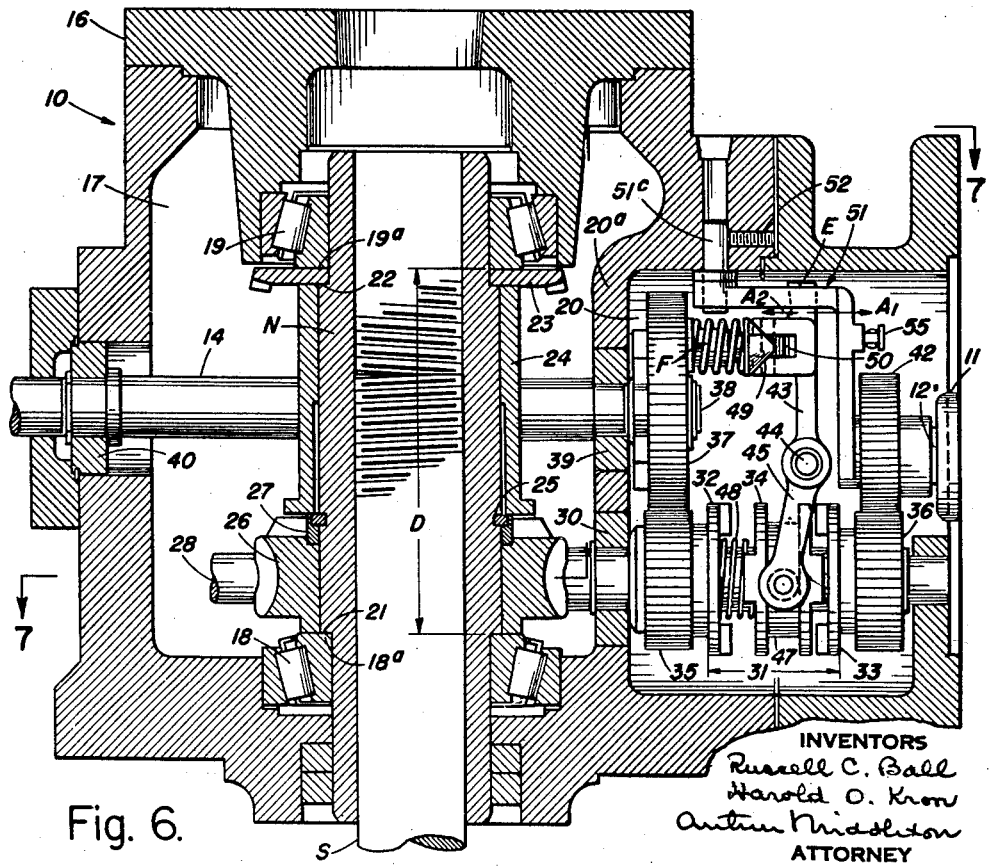
Figure 6 is a non-perspective view of the Figure 1 interlocking mechanism associated with the driving nut for the valve stem, all within a housing in vertical section and identifiable in Figure 5.

The mechanisms contained in housing 10 of Figure 5 and particularly the interlocking mechanism are shown in Figure 6 in which there can be discerned a chamber 17 having rotatably mounted thereon as by conical roller bearings 18 and 19 a driving nut N for the valve stem S, and a chamber 20 containing the interlocking mechanism with a partition wall 20ª defining the chambers. Since, the invention relates to improvements in the interlocking mechanism, that mechanism is also shown in the enlarged view of chamber 20 in Figure 8, while operating views of that mechanism are shown in Figures 1 and 2, with the one operating view in Figure 1 showing the parts in position for motor actuation, and the other view in Figure 2 showing the parts in position for manual operation.

There will now be described in greater detail the mechanisms including the improved interlocking mechanism contained in the chambers 17 and 20 of housing 10. The driving nut N being rotatably mounted in bearings 18 and 19 is secured against axial movement by shoulders 21 and 22 being confined between the respective inner races 18ª and 19ª of the bearings, the inner races being fixed to the driving nut. The distance D between shoulders 18ª and 19ª is occupied by an annular thrust plate 23, a cylindrical spacer 24, a split ring 25, and worm gear 26 with key means 27 for fastening it to the driving nut N.

A worm shaft 28 drives the worm gear and rotates in a pair of bearings 29 and 30 provided in housing 10. The worm shaft 28 extends horizontally through both the chambers 17 and 20 and within the latter chamber has mounted on it a double-acting clutch 31 comprising a pair of clutch members 32 and 33 loose upon the worm shaft and between them a shiftable clutch member 34 slidable axially upon the worm shaft but rotatable therewith. The clutch member 34 is shiftable for selective engagement with either the clutch members 32 and 33 respectively. The loose clutch member 32 is unitary with a gear 35 which thus becomes an idler gear with respect to work shaft 28. The loose clutch member 33 is unitary with a gear 36 which thus also becomes an idler gear with respect to worm shaft 28. The idler gear 35 meshes with a hand torque transmitting gear 37 fixed to the manually driven shaft 14 rotatable in bearings 39 and 40 provided in housing 10, the outer end of shaft 14 having fixed thereon the hand wheel 13 (see Figure 5). The other idler gear 36 meshes with a power transmitting gear 42 fixed to the motor shaft 12. By sliding the intermediate clutch member 34 into engagement with either the clutch member 32 or the clutch member 33 the worm shaft can be selectively driven manually or by power.

The sliding movement of clutch member 34 is controlled by a double-armed clutch lever 43 fulcrumed at 44 upon the walls of chamber 20 and herein also termed the interlocking lever. This lever has a lower end portion in shape of a fork the two prongs 45 and 46 which engage loosely in the groove 47 of the slidable clutch member 34. The upper or free end portion of this lever is engaged by the interlocking means proper in such a manner that the act of rotating the manually driven shaft 14 will activate pressure means such as a finger F for swinging the interlocking lever 43 in the direction of arrow A₁ to shift the clutch member 34 out of engagement with the power-driven clutch member 33 and into engagement with the manually driven clutch member 32 against the pressure of a compression coil spring 48 interposed and effective between clutch members 32 and 34 for urging the clutch member 34 into engagement with the power driven clutch member 33; but when the motor shaft 12 starts rotating such rotation will activate pressure means such as the spring 48 for swinging the interlocking lever 43 in the direction of arrow A₂ to shift the clutch member 34 out of engagement with the power driven clutch member 33 and into engagement with the manually driven clutch member 32.

There will now be described in detail the interlocking mechanism which includes the pressure means which are being activated by the manual drive means and by the power means respectively for shifting the clutch member 34.

Figure 8:
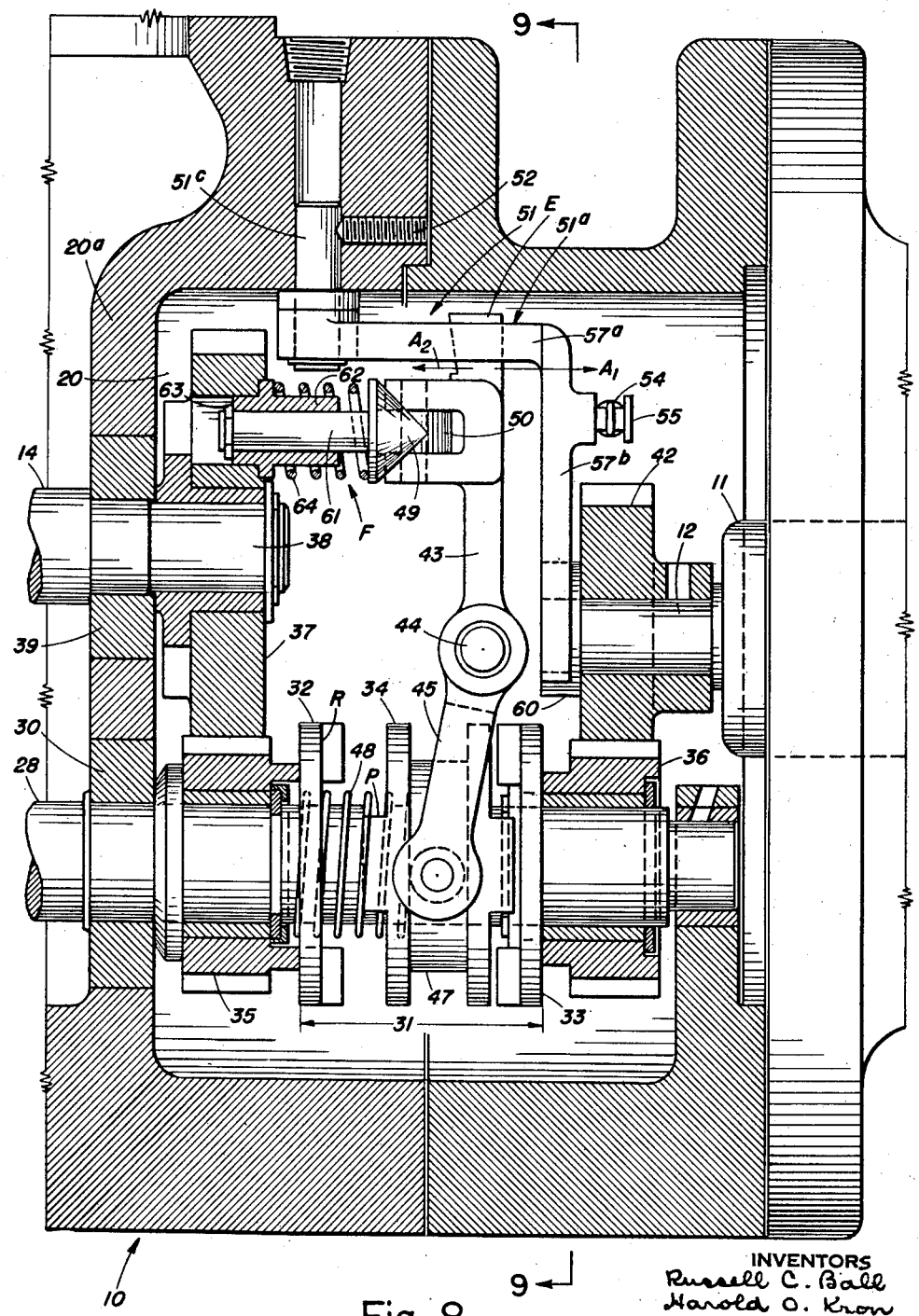
Figure 8 is an enlarged view of the interlocking mechanism shown in Figure 6.
Figure 9:
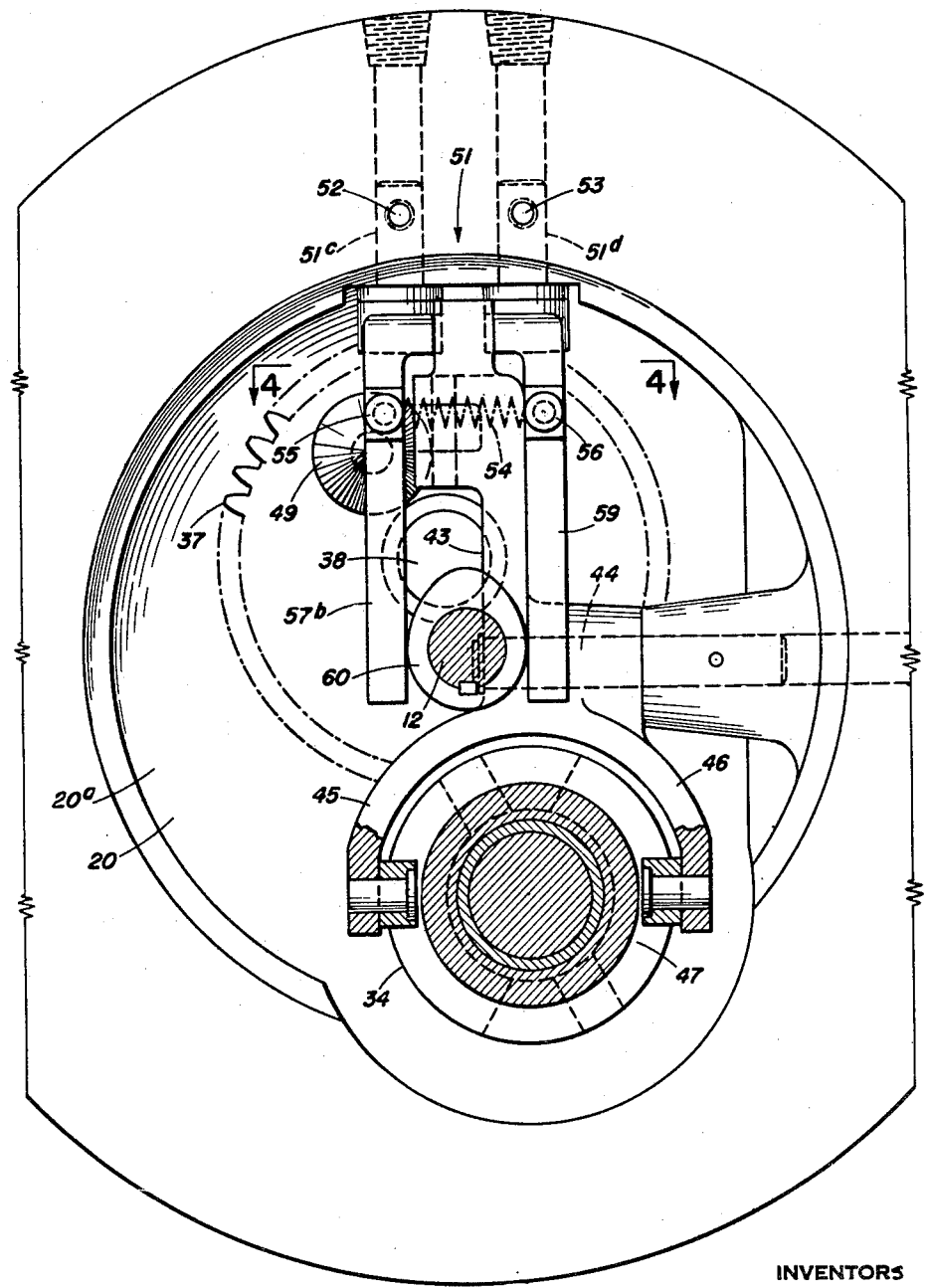
Figure 9 is a vertical section of Figure 8 taken on line 9—9.

Referring to Figure 8, the gear 37 has extending laterally therefrom the finger F having a conical cam finger tip 49 adapted, when the gear is manually rotated, to engage a cam roller 50 provided upon the free end portion of the interlocking lever to urge the lever in the direction of arrow A₁ to a point where it is caught by a detent device 51 (see also Figures 3, 4, 9). That is to say with each revolution of gear 37 the cam finger tip 49 through cam roller 50 forces the interlocking lever against the pressure of spring 48 out of engagement with clutch member 33 and into engagement with clutch member 32.

The detent device to hold the interlocking lever 43 engaged comprises a pair of detent arms 51ª and 51ᵇ swingable about pivot members 51ᶜ and 51ᵈ respectively, the pivot members extending downwardly into chamber 20, being mounted in the top portion of that chamber and secured as by set screws 52 and 53 respectively. The two detent arms are urged towards each other by an interconnecting tension coil spring 54 having its ends anchored upon pins or screw heads 55 and 56 unitary with the arms 51ª and 51ᵇ respectively.

The detent arms have between them the free end portion E which is of square cross section so that it is caught upon shoulders S₁ and S₂ provided on detent arms 51ª and 51ᵇ respectively when the lever is being pressed by cam finger 49 in the direction of arrow A₁ incident to the rotation of gear 37 by hand wheel 13. That is to say, with the first rotation of the hand wheel 13, the cam roller 50 will be engaged by cam finger 49 whereby the interlocking lever is swung from its Figure 1 position (see also Figure 3) to its Figure 2 position (see also Figure 4), against the pressure of spring 48, in which latter position the lever 43 is caught by the shoulders S₁ and S₂. It is to be noted that shoulder S₁ alone is bearing because of a clearance X provided between shoulder S₂ and lever 43 when thus caught. The reason for the differential X in the depth of the shoulders will appear more clearly from the operation of the device described further below. At any rate, when the lever will have thus been moved by the pressure means activated by the rotation of the hand wheel, it will have shifted the clutch member from its connection with the power actuated drive means into connection with the manually actuated drive means.

It will be noted that the one detent arm 51ª has a horizontal body portion 57ª and a vertical downwardly extending end portion 57ᵇ. Similarly the other detent arm 51ᵇ has a horizontal body portion 58 and a vertical downwardly extending end portion 59. By way of these vertical end portions 57 and 59 the detent arms 51ª and 51ᵇ are sequentially engageable by a rotary cam member 60 fixed upon the motor shaft 12 and rotating therewith. The rotation of cam member 60 whenever motor 11 is started will effect the release of the interlocking lever 43 from the detent arms 51ª and 51ᵇ as the cam member 60 urges first the arm 51ª and thereby its shoulder S₁ out of engagement with the interlocking lever, allowing the shoulder S₂ to take over the bearing pressure from the lever until further rotation of the cam member 60 will have urged the arm 51ᵇ also out of engagement with the interlocking lever. This leaves the clutch spring 48 free to shift the clutch member 47 from its Figure 2 position (see also Figure 4) to its Figure 1 position (see also Figure 3), that is from its connection with the manually actuated drive means into connection with the power actuated drive means.

The finger F more particularly comprises a stem 61 formed with the aforementioned cam finger tip 49, slidable in a socket member 62 press-fitted into the gear 37, with a stop head or shoulder 63 provided at the inner end of stem 61, and a compression coil spring 64 urging the cam finger tip 49 outwardly. It is to be noted that the spring 64 is stronger than spring 48, so that the pressure of finger F upon lever 43 will normally overcome the pressure of spring 48 as it should be in the normal functioning of the mechanism. The spring 64 merely serves as a safeguard inasmuch as it allows the finger to become foreshortened sufficiently (with stem 61 sliding in socket member 62) to override cam roller 50 even in case the protrusions P of the slidable clutch member 34 should occasionally fail to catch at once in the recesses R of clutch member 32.

The term "holding means," as referred to herein, is intended to embrace any restraining device which serves, for practical purposes, to maintain the clutch in a position connected to the hand wheel while the hand wheel is being operated and the term "releasing means" embraces any device which serves to release, render ineffective, or overcome the "holding means."

What is claimed is:

1. Valve actuating mechanism for a valve having a valve stem rotatably raisable and lowerable, a worm-wheel for rotating the stem, a worm on a worm-shaft for rotating the worm-wheel, motor means for power driving the worm including a shaft, hand wheel means for manually driving the worm including a shaft, reciprocable clutch means for sequentially drivingly connecting the worm-shaft with either the motor means or the hand wheel means, and interlocking means effective between the motor means and the hand wheel means including pressure means activated only by initial rotation of the hand wheel to urge the clutch means into driving connection with the hand wheel shaft, and secondary pressure means activated only by rotation of the motor means to urge the clutch means into driving connection with the motor shaft.

2. Valve actuating mechanism according to claim 1, wherein means projecting from the motor means shaft activate one of the pressure means.

3. Valve actuating mechanism according to claim 1, wherein cam means on one of the shafts activate one of the pressure means.

4. Valve actuating mechanism according to claim 1, wherein reciprocable means associated with one of the shafts activate one of the pressure means.

5. Valve actuating mechanism according to claim 1, wherein reciprocable means projecting from and beyond one of the shafts are rotated by that shaft and activate one of the pressure means.

6. Valve actuating mechanism for a valve having a valve stem rotatably raisable and lowerable, a worm-wheel for rotating the stem, a worm on a worm-shaft for rotating the worm-wheel, motor means for power driving the worm, hand wheel means for manually driving the worm; clutch means for sequentially drivingly connecting the work-shaft with either the motor means or the hand wheel means including a clutch member reciprocable upon the worm-shaft, a first and a second loose gear upon the worm-shaft, the clutch member being between the gears and selectively connectible with each gear, spring means urging the clutch member into engagement with the first loose gear, a motor driven gear meshing with the first loose gear, and a hand wheel driven gear meshing with the second loose gear; and interlocking means effective between the motor means and the hand wheel means for rotating the worm-shaft either by power or manually which includes an interlocking lever having a free end and an end engaging the clutch member, spring-loaded detent means for releasably holding the free end of the lever to effect engagement of the clutch member with the second loose gear, detent-tripping means rotating with the motor driven gear adapted whenever the motor means is operated to trip the detent for releasing the lever whereby the spring means moves the clutch member into driving connection with the first loose gear, and a cam element rotating with the hand wheel driven gear adapted when the hand wheel is initially rotated to move the lever against the pressure of the spring means until caught by the detent and thereby moving the clutch member into driving connection with the second loose gear.

7. Mechanism according to claim 6, in which the detent means include a pair of swingable arms with spring means interconnecting them but urging them against each other with each arm having a horizontal body portion and a vertical end portion, and the detent-tripping cam being between the vertical end portions whereby rotation thereof engages the vertical portions sequentially in releasing the lever.

8. Mechanism according to claim 6, in which the cam element is resiliently yieldable only to the extent that it will not yield to the pressure of the clutch-urging spring means but will yield when the movement of the clutch member is impeded.

9. Valve actuating mechanism for a valve having a rotatable valve stem, said valve being rotatably openable and closable, a worm-wheel for rotating the stem, a worm on a worm-shaft for rotating the worm-wheel, a motor for power driving the worm including a shaft, a hand wheel for manually driving the worm including a shaft, a reciprocable clutch on the worm-shaft for drivingly connecting the worm-shaft with either the motor or the hand wheel, an operating lever for reciprocating the clutch to connect the worm-shaft with either the motor or the hand wheel, a lever operatively associated with the hand wheel and rigidly connected to the clutch operating lever to actuate the clutch operating lever upon initial movement of the hand wheel to reciprocate the clutch operator to connect the worm-shaft with the hand wheel so that upon continued movement of the hand wheel the valve is actuated, holding means operatively and mechanically associated with the hand wheel to hold the clutch in connecting position to the hand wheel, means on the motor shaft to release the holding means upon initial movement of the motor so as to release the clutch operator and clutch from engagement with the hand wheel and means operatively connected with the clutch to reciprocate the clutch to connect the worm-shaft to the motor.

10. Valve actuating mechanism comprising a worm wheel for actuating the valve, a worm on a worm-shaft for rotating the worm-wheel, a motor for power driving the worm-shaft, a hand-wheel for manually driving the worm-shaft, a clutch movably carried by the worm-shaft for drivingly connecting the worm-shaft with the motor or hand wheel, a clutch operator for operating the clutch, a member carried by the hand wheel, means movable into and out of driving contact with the clutch operator actuatable by said member to move the clutch to connect the hand wheel to the worm-shaft upon initial movement of the hand wheel so that upon continued movement of the hand wheel the valve is actuated, said member and the movable means actuated thereby including elements for holding the clutch in connecting position to the hand wheel, means operated by the initial movement of the motor to release the holding elements and thereby disconnect the clutch from the hand wheel and means operatively connected with the clutch to move the clutch to connect the motor to the worm-shaft.

11. Valve actuating mechanism for a valve having a rotatable stem rotatably openable and closable, a worm-wheel for rotating the stem, a worm on a worm-shaft for rotating the worm-wheel, a motor for power driving the worm-shaft, a hand wheel for manually driving the worm-shaft, the hand wheel including a shaft having a gear thereon meshing with a free gear on the worm-shaft, the motor including a shaft having a worm thereon meshing with a gear on the worm-shaft, a clutch movably carried by the worm-shaft and keyed thereto, a clutch operating lever operatively associated with the hand wheel shaft and gear, a pin carried by the hand wheel gear, the pin having a cam face thereon and a spring surrounding the pin to force the same outwardly from the gear, the cam face of the pin engaging the clutch operating lever upon initial movement of the hand wheel its shaft and gear and forcing the clutch into connecting position to connect the free hand wheel gear and worm-shaft so as to drive the worm-shaft and upon continued movement of the hand wheel the valve is actuated, an extension on the clutch operating lever adjacent to and actuated by the cam face, spring loaded locking levers adjacent the extension engaging the extension and locking the clutch operating lever and clutch in connecting position for driving the worm-shaft by the hand wheel, a cam on the motor shaft adjacent the gear, the cam engaging the spring loaded locking levers and upon initial movement of the motor forcing the locking levers apart releasing the extension and disconnecting the hand wheel from the worm-shaft, a spring on the worm-shaft between the hand wheel free gear and the clutch forcing the clutch into engagement with the motor free gear to connect the motor to the worm-shaft when the extension is released by the spring loaded locking lever.

RUSSELL C. BALL.
HAROLD O. KRON.

No references cited.